(12) United States Patent
Hasegawa (10) Patent No.: US 8,352,122 B2
(45) Date of Patent: Jan. 8, 2013

(54) ENGINE CONTROL APPARATUS AND STRADDLE-TYPE VEHICLE

(75) Inventor: Takahiko Hasegawa, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 1274 days.

(21) Appl. No.: 11/953,564

(22) Filed: Dec. 10, 2007

(65) Prior Publication Data

US 2008/0306653 A1    Dec. 11, 2008

(30) Foreign Application Priority Data

Dec. 11, 2006   (JP) ................................ 2006-333642

(51) Int. Cl.
*G01M 17/00* (2006.01)
*B60K 28/14* (2006.01)
*G06F 7/00* (2006.01)

(52) U.S. Cl. .............................. 701/38; 701/46; 280/755

(58) Field of Classification Search .................... 701/38, 701/46, 70, 99; 123/325; 280/755, 703; 180/283
See application file for complete search history.

(56) References Cited

U.S. PATENT DOCUMENTS

| | | | | |
|---|---|---|---|---|
| 4,355,607 A * | 10/1982 | Blaney | ............................ | 123/350 |
| 4,697,560 A * | 10/1987 | Umehara | ........................ | 123/335 |
| 4,984,161 A * | 1/1991 | Nakazawa et al. | ............... | 701/55 |
| 5,211,420 A * | 5/1993 | Iwashita | ...................... | 280/5.503 |
| 6,758,189 B2 * | 7/2004 | Uraki et al. | ..................... | 123/325 |
| 6,834,739 B2 * | 12/2004 | Iyoda et al. | .................... | 180/282 |
| 6,941,206 B2 * | 9/2005 | Hasegawa et al. | ............... | 701/38 |
| 2002/0039951 A1 * | 4/2002 | Hasegawa | ....................... | 477/183 |
| 2003/0132837 A1 * | 7/2003 | Hasegawa et al. | ............. | 340/440 |
| 2004/0094912 A1 * | 5/2004 | Niwa et al. | .................. | 280/5.518 |
| 2004/0220708 A1 * | 11/2004 | Owen et al. | ....................... | 701/29 |
| 2006/0054375 A1 * | 3/2006 | Kakinuma | ..................... | 180/282 |
| 2007/0061107 A1 * | 3/2007 | Vock et al. | ..................... | 702/182 |
| 2007/0208530 A1 * | 9/2007 | Vock et al. | ..................... | 702/141 |

FOREIGN PATENT DOCUMENTS

| | | | |
|---|---|---|---|
| EP | 1184233 A1 * | 3/2002 | |
| JP | 05-332238 | 12/1993 | |

OTHER PUBLICATIONS

JP 03074533A to Tagami, Mar. 1991, Abstract of Japan.*

* cited by examiner

*Primary Examiner* — Tan Q Nguyen
(74) *Attorney, Agent, or Firm* — Rabin & Berdo, P.C.

(57) ABSTRACT

An engine control apparatus that effectively suppresses a rise in rotation number of an engine in a jump of a vehicle. An engine control apparatus includes an acceleration detecting device for detecting an acceleration component of gravity acceleration in a perpendicular direction of the vehicle body based on a signal inputted from an acceleration sensor, and a control circuit for judging whether the vehicle has jumped or not based on the acceleration component to be detected. The control circuit suppresses a rise in rotation number of the engine when the vehicle is judged to have jumped.

9 Claims, 9 Drawing Sheets

ENGINE CONTROL APPARATUS AND STRADDLE-TYPE VEHICLE

RELATED APPLICATIONS

This application claims the benefit of priority under 35 USC 119 of Japanese patent application no. 2006-333642, filed on Dec. 11, 2006, which application is hereby incorporated by reference in its entirety.

BACKGROUND OF THE INVENTION

1. Field of the Invention

The invention relates to an engine control apparatus for preventing over-rotation of an engine of a straddle-type vehicle.

2. Description of Related Art

An engine control apparatus for a straddle-type vehicle such as a motorcycle or snowmobile has been proposed to prevent excessive engine rotation and to thereby improve the endurance of the engine (see JP-A-H05-332238, for example).

A rider sometimes jumps a straddle-type vehicle. An off-road type motorcycle, for example, may be jumped on a jumping platform provided in a racing course. In jumping, a tire leaves the road surface, so that no load is added on the engine.

A conventional engine control apparatus executes a control to prevent excessive engine rotation on the assumption that a load generated in running on a road surface is added to the engine in driving the engine. Accordingly, this control does not sufficiently function during a jump in which no load is added to the engine.

SUMMARY OF THE INVENTION

In view of the above problem, the invention provides an engine control apparatus that effectively suppresses a rise in rotation number of an engine in jumping.

An engine control apparatus in accordance with the invention comprises: an acceleration detecting means for detecting an acceleration component of gravity acceleration in a predetermined direction of a vehicle; a jump judging means for judging whether the vehicle has jumped or not based on the acceleration component detected by the acceleration detecting means; and a rotation number rise suppression processing means for suppressing a rise in rotation number of an engine when the jump judging means judges that the vehicle has jumped.

A straddle-type vehicle in accordance with the invention is provided with the engine control apparatus. The straddle-type vehicle may be a motorcycle (including a motor scooter), a four-wheel buggy, a snowmobile, a water motorcycle and such.

In accordance with the invention, a jump judging means judges whether a vehicle has jumped or not. A process for suppressing a rise in rotation number of an engine is performed when it is judged that the vehicle has jumped. Accordingly, a rise in rotation number of an engine is effectively suppressed in jumping.

Moreover, the jump judging means judges that the vehicle has jumped under the condition that the acceleration satisfying a predetermined condition is continuously detected. Accuracy in judgment of whether the vehicle has jumped or not is thereby improved.

Another aspect of the invention is a turnover judging means for judging whether the vehicle has been turned over or not based on an acceleration component detected by the acceleration detecting means and a result of judgment by the jump judging means. A value of an acceleration component of gravity acceleration, which operates on a vehicle body, is varied from the acceleration operating in normal running in both cases of turnover and a jump of the vehicle. This is likely to cause a wrong judgment of turnover when the vehicle should be judged to be in jumping. In accordance with the invention, the turnover judging means judges whether the vehicle has been turned over or not based not only on the acceleration but also a result of the judgment by the jump judging means. This prevents an error in judgment from occurring.

Another aspect of the invention provides an adjusting mechanism for electromagnetically varying attenuation force of a suspension; and a suspension control means for varying the attenuation force of the suspension obtained by the adjusting mechanism based on a result of judgment by the jump judging means. In accordance with the aspect, a feeling about riding in landing after a jump of the vehicle is improved.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
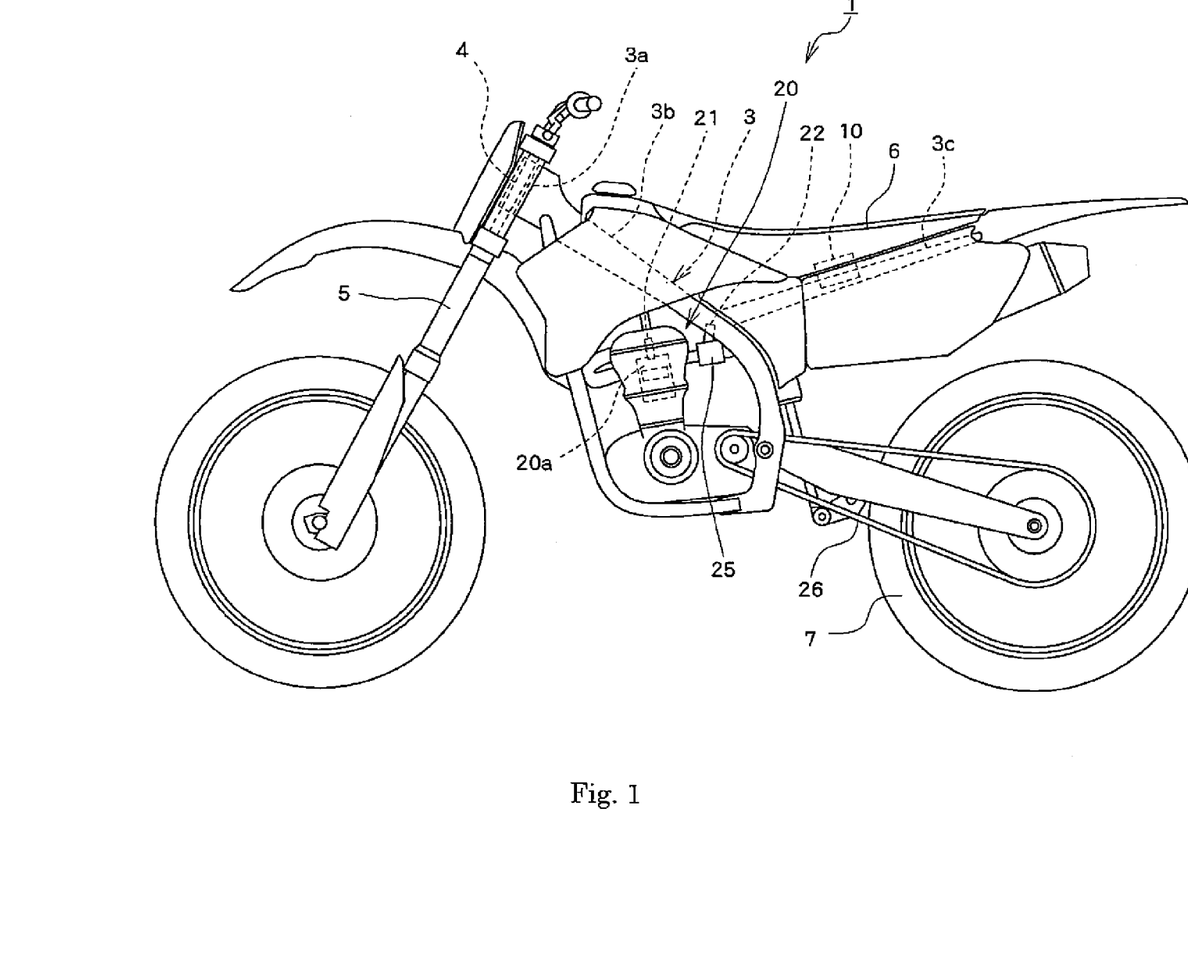
FIG. 1 is a side view of a motorcycle having an engine control apparatus in accordance with an embodiment of the invention.

An embodiment of the invention is now described with reference to the drawings. FIG. 1 is a side view of a motorcycle 1 to which an engine control apparatus 10 is mounted. Motorcycle 1 comprises engine control apparatus 10, an engine 20 and a body frame 3.

A steering head part 3a at a front end part of body frame 3 supports a steering shaft 4. Steering shaft 4 is connected to a front suspension 5 extending obliquely in a perpendicular direction. Front suspension 5 includes a spring and an oil dumper mechanism, which are for absorbing shocks in running.

Body frame 3 has a main frame 3b that extends rearward from steering head part 3a and curves downward. Engine 20 is provided under main frame 3b. Driving force outputted from engine 20 is transmitted to a rear wheel 7 through a driving force transmission mechanism 26 (a chain in this case). Engine 20 includes an ignition plug 21 for igniting a mixed gas of fuel and air, which are supplied to a cylinder 20a.

An intake port of engine 20 is connected to a throttle body 25 supplied with air from an air cleaner. An injector 22 for injecting fuel into an intake path is fitted to throttle body 25. Throttle body 25 mixes fuel injected from injector 22 with air supplied from the air cleaner and supplies engine 20 with the mixture.

A seat rail 3c is connected at a middle part of main frame 3b and extends rearward to support seat 6. Engine control apparatus 10 is provided under seat 6. However, engine control apparatus 10 may be provided at other locations such as a front end part of main frame 3b, for example.

Figure 2:
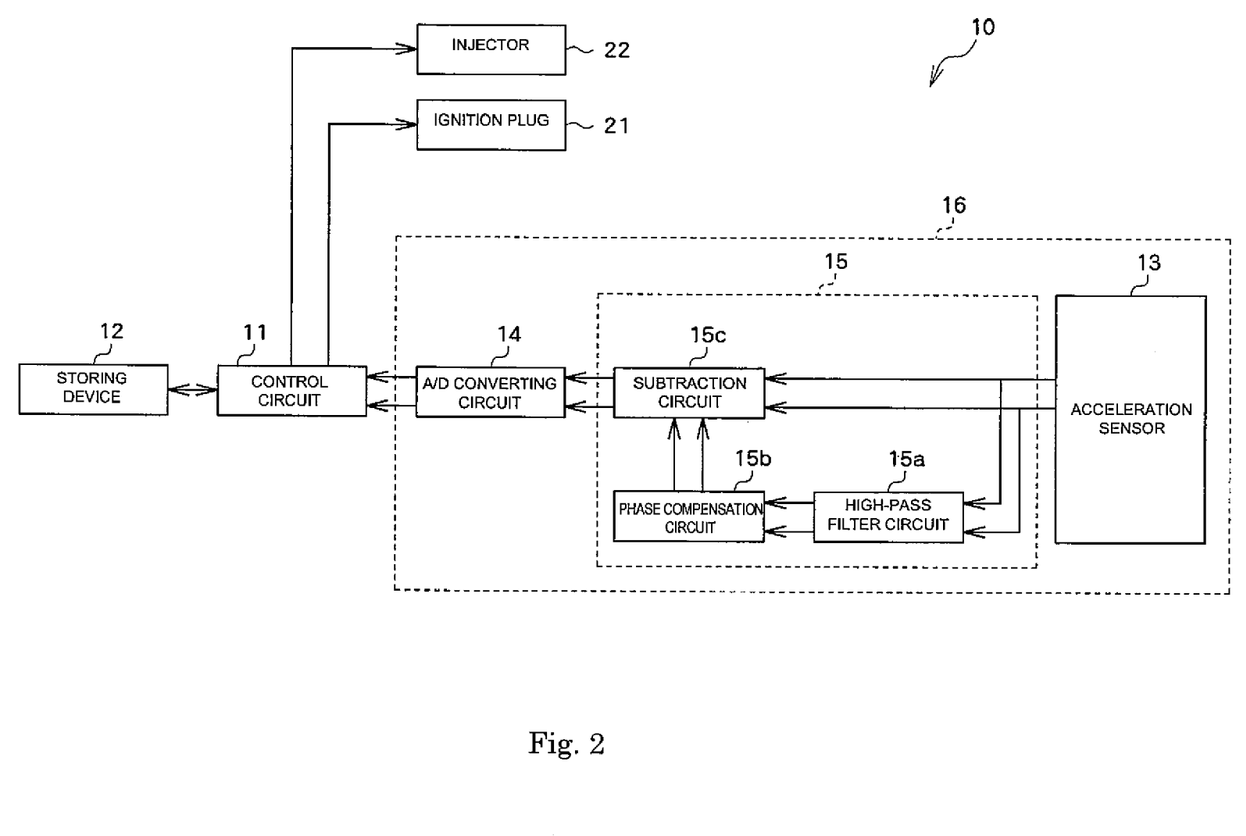
FIG. 2 is a block diagram of the engine control apparatus.

FIG. 2 is a block diagram of engine control apparatus 10, which includes a control circuit 11, a storing device 12 and an acceleration detecting device 16. Acceleration detecting device 16 includes an acceleration sensor 13, an A/D converting circuit 14, a high-pass filter circuit 15a, a phase compensation circuit 15b and a subtraction circuit 15c. High-pass filter circuit 15a, phase compensation circuit 15b and subtraction circuit 15c form a noise removing circuit 15 for removing noise from an output signal of acceleration sensor 13. In one embodiment, noise removing circuit 15 is an analog circuit.

Control circuit 11 includes a CPU (a central processing unit) and executes a program stored in storing device 12 to control electrical equipment mounted to motorcycle 1. For example, control circuit 11 controls ignition timing of ignition plug 21, a fuel injection quantity of injector 22 and the like in accordance with a driving state of motorcycle 1. Further, control circuit 11 judges whether motorcycle 1 has jumped or not based on a signal inputted from acceleration sensor 13. When motorcycle 1 is judged to have jumped, a process is executed for suppressing a rise in rotation number of the engine.

Storing device 12 includes a volatile memory and a nonvolatile memory to hold a program to be executed by control circuit 11. Storing device 12 stores a permissible rotation number of engine 20 in normal running or a permissible rotation number of engine 20 in jumping. When a rotation number of engine 20 exceeds the permissible rotation number, control circuit 11 executes a control to suppress a rise in rotation number of engine 20.

Acceleration sensor 13 may be an electrostatic capacity type acceleration sensor using a semiconductor, for example, and may use a piezoelectric element. In this embodiment, acceleration sensor 13 has two orthogonal directions as detection directions: a perpendicular direction (direction of height) and a lateral direction (direction of width) of the vehicle body. Acceleration sensor 13 outputs a signal corresponding to an acceleration component of gravity acceleration in the perpendicular direction and the lateral direction to subtraction circuit 15c and high-pass filter circuit 15a.

While acceleration sensor 13 is described as using a semiconductor, it could also be, for example, a pendulum type acceleration sensor. Moreover, acceleration sensor 13 may be a triaxial sensor for detecting acceleration in three directions or two single-axis sensors instead of a biaxial sensor for detecting acceleration in two directions. In the case that acceleration sensor 13 is a triaxial sensor, two directions of three detection directions are set at the perpendicular direction and the lateral direction, for example.

Acceleration sensor 13 is positioned with respect to a casing or a base of engine control apparatus 10 so that the two detecting directions are the perpendicular and lateral directions of the vehicle body, regardless of the location or position of engine control apparatus 10. For example, when engine control apparatus 10 is provided under seat 6 such that its base is horizontal, biaxial acceleration sensor 13 is provided perpendicularly to the base of apparatus 10. The two detecting directions of acceleration sensor 13 are thus set at the perpendicular and lateral directions of the vehicle body. Conversely, when engine control apparatus 10 is provided at the front end of main frame 3b such that its base is perpendicular, biaxial acceleration sensor 13 is provided horizontally to the base of apparatus 10. Thus, the two detection directions of the acceleration sensor in this case are also the perpendicular and lateral directions of the vehicle body. If acceleration sensor 13 is a triaxial acceleration sensor, acceleration sensor 13 is positioned with respect to the casing or base of engine control apparatus 10 so that two of the three detection directions are the perpendicular and lateral directions of the vehicle body.

Noise removing circuit 15 extracts (subtracts) a noise signal (a signal caused by vibration of the vehicle, vibration of engine 20, or the like) from a signal inputted from acceleration sensor 13 to generate an acceleration signal that is outputted to A/D converting circuit 14. The circuits forming noise removing circuit 15 are now described in detail.

High-pass filter circuit 15a extracts a noise signal from the signal inputted from acceleration sensor 13. That is, high-pass filter circuit 15a attenuates signals having a frequency lower than a predetermined cutoff frequency and passes signals having a frequency higher than the cutoff frequency therethrough. A high frequency signal passing through high-pass filter circuit 15a is inputted to phase compensation circuit 15b. Generally, a noise signal due to vibration of engine 20 or such has a frequency higher than that of a signal varying in accordance with a jump of the vehicle. Thus, the cutoff frequency is set to be lower than a frequency of the noise signal and higher than a frequency of an acceleration signal varying in a jump of the vehicle, so that high-pass filter circuit 15a outputs the noise signal.

Phase compensation circuit 15b compensates a phase shift of a signal that is caused by passing through high-pass filter circuit 15a. For example, when high-pass filter circuit 15a advances a phase of a signal by a predetermined phase difference, phase compensation circuit 15b outputs a phase of the signal inputted from high-pass filter circuit 15a to subtraction circuit 15c so that a phase of the signal is delayed by the predetermined phase difference.

Subtraction circuit 15c subtracts a noise signal inputted from phase compensation circuit 15b from the signal inputted from acceleration sensor 13 to generate an acceleration signal that is outputted to A/D converting circuit 14 as an acceleration signal. A/D converting circuit 14 converts the analog acceleration signal inputted from subtraction circuit 15c into a digital signal that is outputted to control circuit 11.

Figure 3:
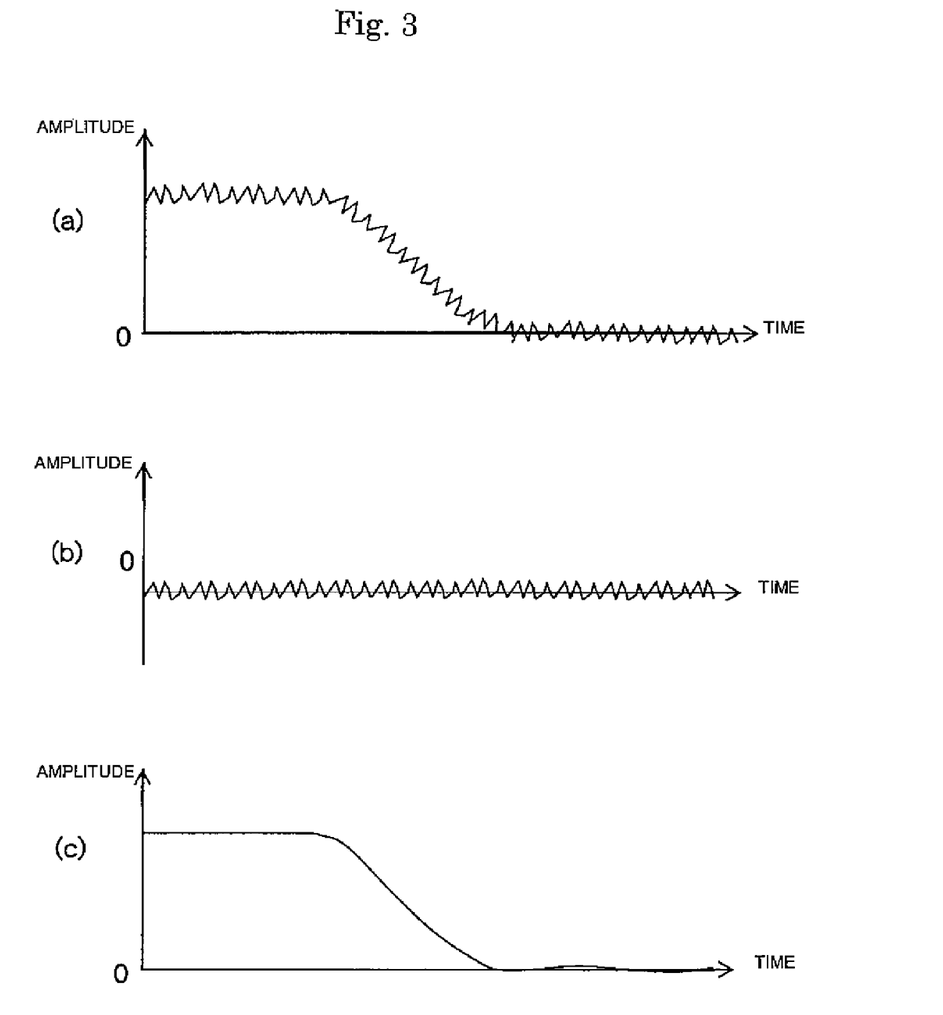
FIGS. 3(a)-3(c) are diagrams of output signals of an acceleration sensor, a phase compensation circuit and a subtraction circuit of the engine control apparatus.

FIG. 3(a) shows an example of a signal outputted from acceleration sensor 13. FIG. 3(b) shows an example of a noise signal outputted from phase compensation circuit 15b. FIG. 3(c) shows an example of an acceleration signal outputted from subtraction circuit 15c. In the drawings, the horizontal axis shows time while the perpendicular axis shows amplitude of a signal. Further, a case where a jump of the vehicle body causes a decrease in a component of gravity acceleration in the perpendicular direction is exemplified here.

As shown in FIG. 3(a), a signal outputted from acceleration sensor 13 decreases with passage of time and includes a noise signal having a high frequency, that is generated due to vibration of engine 20 or the vehicle body.

High-pass filter circuit 15a suppresses low frequency signals included in the signals inputted from acceleration sensor 13, and passes only high frequency signals. As a result, a noise signal having a high frequency only is outputted from phase compensation circuit 15b as shown in FIG. 3(b).

Subtraction circuit 15c subtracts the noise signal inputted from phase compensation circuit 15b from the signal inputted from acceleration sensor 13 to generate an acceleration signal which, as shown in FIG. 3(c), has a low frequency, and shows a component in the perpendicular direction of gravity acceleration. In FIG. 3(c), the acceleration signal gradually decreases with passage of time. This shows that the component of acceleration in the perpendicular direction becomes smaller than in a case of normal running.

In the example described above, noise removing circuit 15 includes high-pass filter circuit 15a and subtraction circuit 15c to remove noise by subtracting a signal inputted through high-pass filter circuit 15a from a signal inputted from acceleration sensor 13. Alternatively, noise removing circuit 15, may include a low-pass filter circuit, instead of high-pass filter circuit 15a and subtraction circuit 15c. The low-pass filter circuit may remove a noise signal having a high frequency from the signal inputted from acceleration sensor 13 to generate an acceleration signal.

A process executed by control circuit 11 is now described. Control circuit 11 judges whether the vehicle has jumped and executes a process for suppressing a rise in rotation number of the engine when the vehicle is judged to have jumped. Concretely, control circuit 11 lowers the set permissible rotation number of engine 20.

Figure 4:
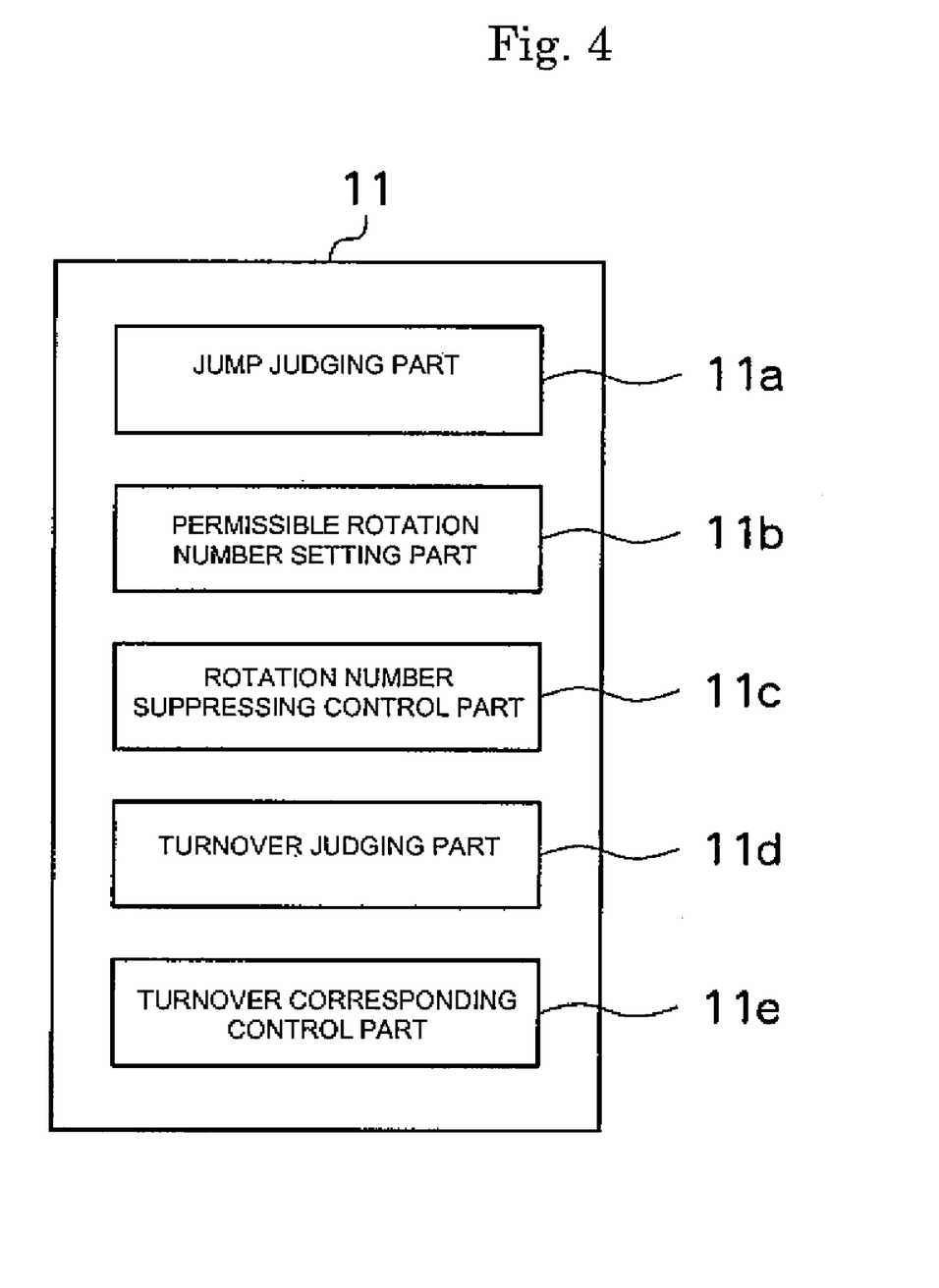
FIG. 4 is a block diagram of a control circuit of the engine control apparatus.

FIG. 4 is a block diagram of a process executed by control circuit 11. Control circuit 11 includes a jump judging part 11a, a permissible rotation number setting part 11b, a rotation number suppressing control part 11c, a turnover judging part 11d and a turnover corresponding control part 11e.

Jump judging part 11a judges whether the vehicle has jumped or not based on an acceleration component of gravity acceleration, which is detected by acceleration sensor 13. A jump judging process by jump judging part 11a is executed as described below.

Jump judging part 11a detects an acceleration component in the perpendicular direction of the vehicle in a predetermined sampling cycle. The vehicle is judged to have jumped when the acceleration component becomes lower than a predetermined threshold value (referred to as a jump judgment reference value, hereinafter). The vehicle is then judged to have landed when the acceleration component in the perpendicular direction exceeds a threshold value different from the jump judgment reference value (referred to as a landing Judgment reference value, hereinafter). In this embodiment, the jump judgment reference value is a value approximate to 0 while the landing judgment reference value is the gravity acceleration, for example.

Figure 5:
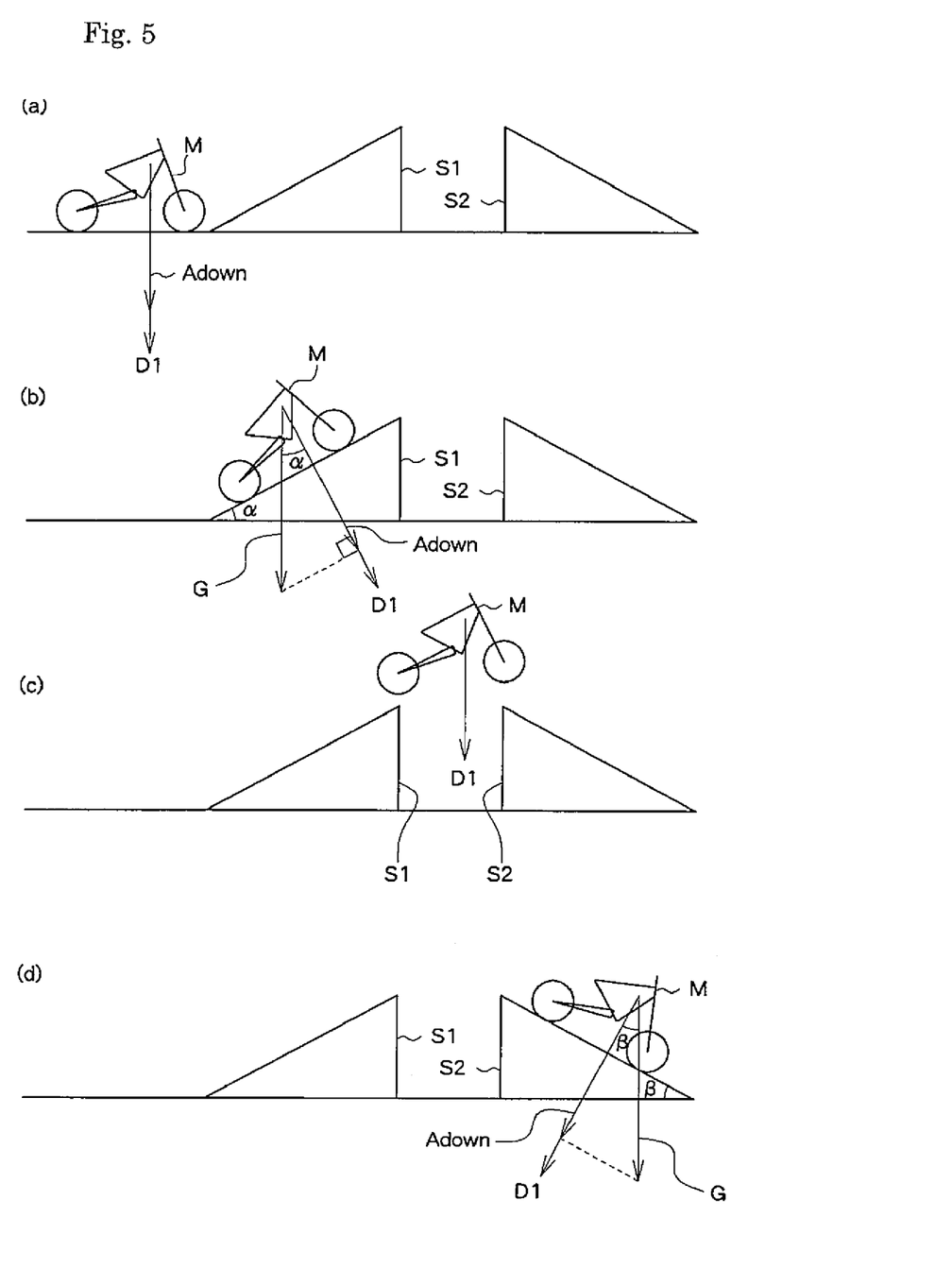
FIGS. 5(a)-5(d) are side views of a vehicle in running, jumping and landing and illustrate acceleration detected by an acceleration sensor according to the invention.

FIG. 5 illustrates acceleration detected by acceleration sensor 13 in normal running and jumping. FIG. 5(a) shows an acceleration component of gravity acceleration operating on a vehicle body M in normal running. FIG. 5(b) shows an acceleration component operating on vehicle body M in running on a jumping platform. FIG. 5(c) shows vehicle body M in jumping. FIG. 5(d) shows an acceleration component operating on vehicle body M in landing.

In the case of normal running as shown in FIG. 5(a), an acceleration component Adown in perpendicular direction D1, which is detected by acceleration sensor 13, is a vertical direction and equal to gravity acceleration G. When vehicle body M runs on a jumping platform S1 as shown in FIG. 5(b), acceleration component Adown is determined in accordance with an angle of inclination α of jumping platform S1, and is smaller than gravity acceleration G. When vehicle body M jumps as shown in FIG. 5(c), acceleration component Adown in perpendicular direction D1 of the vehicle is 0. When vehicle body M reaches a jumping platform S2 as shown in FIG. 5(d), acceleration component Adown is determined in accordance with an angle of inclination β of jumping platform S2, and is smaller than gravity acceleration G.

Component Adown in perpendicular direction D1 of the gravity acceleration operating on the vehicle body in jumping is 0, as described above. Accordingly, jump judging part 11a judges that the vehicle has jumped when acceleration component Adown in perpendicular direction D1 becomes lower than the jump judgment reference value and judges that the vehicle has landed when acceleration component Adown in perpendicular direction D1 exceeds the landing judgment reference value after jumping.

Moreover, jump judging part 11a may judge whether the vehicle has jumped or not on the basis of an acceleration component in the perpendicular direction of the vehicle and an acceleration component in the lateral direction. For example, the acceleration component in the perpendicular direction of the vehicle is detected in a predetermined sampling cycle while the acceleration component in the lateral direction of the vehicle is also detected. The vehicle is judged to have jumped in the case that the acceleration component in the perpendicular direction becomes lower than the jump judgment reference value and the acceleration component in the lateral direction is smaller than a predetermined threshold value (referred to as a jump judgment lateral direction reference value, hereinafter). Then, the vehicle is judged to have landed when the acceleration component in the perpendicular direction exceeds the landing judgment reference value. This allows judgment of a jump of the vehicle to be performed more accurately. That is, the acceleration component in the perpendicular direction becomes smaller even in the case of turnover of the vehicle, so that an error in judgment between a jump and a turnover is likely to happen, as described later. Judging whether the vehicle has jumped or not by means of the jump judging part 11a based on the acceleration component in the perpendicular direction and in the lateral direction, however, can prevent an error in judgment from occurring since the acceleration component in the lateral direction becomes large in turnover.

Furthermore, jump judging part 11a may judge that the vehicle has jumped when an acceleration meeting predetermined requirements is detected continuously for a predetermined time. Concretely, when the acceleration component in the perpendicular direction becomes lower than the jump judgment reference value, jump judging part 11a starts measurement of passage of time from a point of time when the acceleration component in the perpendicular direction becomes lower than the jump judgment reference value while continuing detection of the acceleration component in the perpendicular direction. It is then judged that the vehicle has jumped when the acceleration component below the jump judgment reference value continues for a predetermined time (referred to as a jump judgment reference time, hereinafter).

In addition, jump judging part 11a may judge whether the vehicle has jumped or not based not only on an acceleration component of gravity acceleration but also a driving state just before the time the acceleration component falls below the jump judgment reference value. For example, a throttle position sensor for detecting a throttle opening may be provided in a throttle body 25. Jump judging part 11a detects the acceleration component in the perpendicular direction and the throttle opening and temporarily stores the detected throttle opening in storing device 12. When the acceleration component in the perpendicular direction falls below the jump judgment reference value, the throttle opening detected just before the above is read out from storing device 12. The vehicle is judged to have jumped in the case that the throttle opening exceeds a predetermined threshold value. Accuracy in judgment is improved since it is judged whether the vehicle has jumped or not based not only on acceleration but also on the existence of a throttle operation carried out just before a jump for the purpose of accelerating the vehicle.

Permissible rotation number setting part 11b decreases the permissible rotation number of engine 20 when jump judging part 11a judges that the vehicle has jumped. Concretely, the permissible rotation number of engine 20 is decreased from the permissible rotation number in normal running (referred to as a normal permissible rotation number, hereinafter) to a smaller value (referred to as a permissible rotation number in jumping, hereinafter) and stored in storing device 12 when jump judging part 11a judges that the vehicle has jumped. When jump judging part 11a judges that the vehicle has landed after the above, the permissible rotation number in jumping is changed again to the normal permissible rotation number and stored in storing device 12.

Rotation number suppressing control part 11c reduces an output of engine 20 when the rotation number of engine 20 exceeds the permissible rotation number. A process by rotation number suppressing control part 11c is executed as follows.

A rotation sensor is provided in a crank shaft, a cam shaft or the like in engine 20 for outputting a pulse signal in accordance with a rotation of the shaft. Rotation number suppressing control part 11c calculates the rotation number of the engine based on the pulse signal. The permissible rotation number in jumping set by permissible rotation number setting part 11b is compared with the rotation number of engine 20 in a jump of the vehicle. When the rotation number of engine 20 exceeds the permissible rotation number in jumping, the timing of ignition of engine 20 by ignition plug 21 is delayed or the frequency of ignition is reduced so as to reduce the output of engine 20. On the other hand, the rotation number of engine 20 is compared with the normal permissible rotation number in normal running. When the rotation number of engine 20 exceeds the normal permissible rotation number, a control for suppressing a rise in the rotation number of engine 20 is carried out, similarly to the above. In the above context, reducing the frequency of ignition by ignition plug 21 means putting off the ignition at the time when the ignition should be originally carried out by ignition plug 21 to cause a misfire.

Turnover judging part 11d judges whether the vehicle has been turned over or not on the basis of the acceleration component of gravity acceleration, which is detected by acceleration sensor 13. For example, turnover judging part 11d detects an acceleration component in the lateral direction of the vehicle in a predetermined sampling cycle. The vehicle is judged to have been turned over when the acceleration component exceeds a predetermined threshold value.

Further, turnover judging part 11d may judge whether the vehicle has been turned over or not based on an acceleration component in the perpendicular direction of the vehicle body, an acceleration component in the lateral direction and a result of the judgment by jump judging means 11a. An operation in this case is executed as follows.

Turnover judging part 11d detects an acceleration component in the perpendicular direction and an acceleration component in the lateral direction of the vehicle body in a predetermined sampling cycle based on an acceleration signal. Turnover judging part 11d then judges that the vehicle has been turned over when the acceleration component in the perpendicular direction is smaller than a fixed threshold value, the acceleration component in the lateral direction is larger than a threshold value different from the above threshold value and jump judging part 11a judges that the vehicle is not in jumping. This prevents turnover judging part 11d from judging a jump as turnover by mistake, and thereby, prevents turnover corresponding control part 11e from executing a later-mentioned process.

Figure 6:
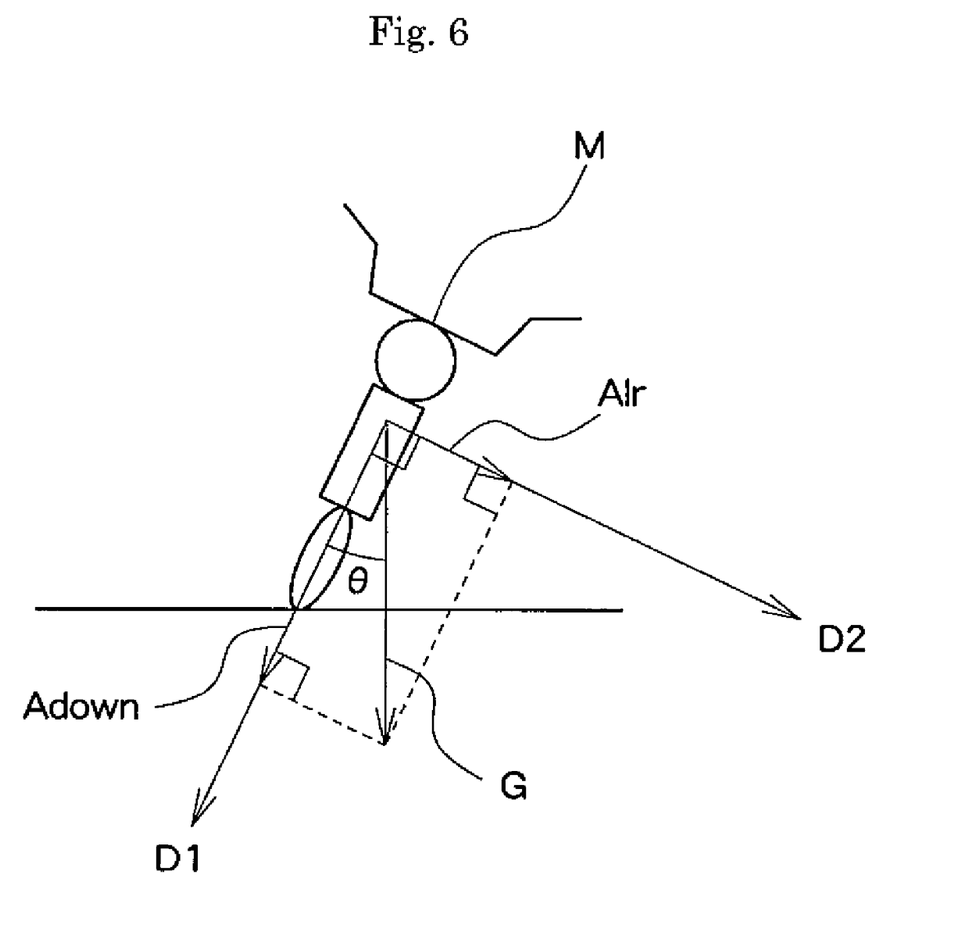
FIG. 6 is a front view of a vehicle illustrating an acceleration component of gravity acceleration operating on the vehicle body in a position inclined in a lateral direction.

FIG. 6 illustrates a process for detecting turnover of the vehicle based on an acceleration component in the perpendicular direction and an acceleration component in the lateral direction of the vehicle body. In FIG. 6, a vehicle body M is simply shown in a front view and inclining in the lateral direction.

Acceleration component Adown in perpendicular direction D1 of the vehicle body decreases as a lateral angle of inclination θ (a rolling angle) of the vehicle body increases. On the other hand, an acceleration component Alr in lateral direction D2 of the vehicle body increases as the rolling angle θ of the vehicle body increases. Further, acceleration component Adown in perpendicular direction D1 of the vehicle body also decreases in a jump of the vehicle, as shown in FIGS. 5(b) to 5(c). Turnover judging part 11d judges that the vehicle has been turned over when acceleration component Adown in perpendicular direction D1 is smaller than a predetermined threshold value, that acceleration component Alr in lateral direction D2 is larger than a predetermined threshold value and that the vehicle is judged not to be in a jump.

Turnover judging part 11d may judge whether the vehicle is turned over or not based on a rolling angle of the vehicle body. That is, turnover judging part 11d calculates a value that is obtained by dividing acceleration Alr of the vehicle body in lateral direction D2 by acceleration component Adown in perpendicular direction D1, as a tangent value "tan" (θ) of rolling angle θ of the vehicle body (tan(θ)=Alr/Adown; refer to FIG. 6). The vehicle may be judged as having been turned over when tangent value tan(θ) is larger than a predetermined threshold value (referred to as a turnover judgment reference value, hereinafter) and the vehicle is judged not to be in a jump. The above turnover judgment reference value is a tangent value of a limit value (70°, for example) of the rolling angle in the case of normal running of the vehicle. This more certainly prevents an error in judgment between a jump and turnover from occurring.

Moreover, turnover judging part 11d may judge that the vehicle has been turned over when the calculated tangent value of the rolling angle exceeds the turnover judgment reference value continuously for a predetermined time period. A process in this case is carried out as follows.

Turnover judging part 11d detects an acceleration component in the perpendicular direction and an acceleration component in the lateral direction of the vehicle body in a predetermined sampling cycle to calculate a tangent value of the rolling angle based on the acceleration components. When the tangent value exceeds the turnover judgment reference value, measurement of time is started from that point of time while the detection of the acceleration components and the calculation of the tangent value based on the detection are continued. It is judged that the vehicle has been turned over when the tangent value exceeding the turnover judgment reference value is detected continuously for a predetermined time (referred to as a turnover judgment reference time, hereinafter) and when the vehicle is judged not to be in a jump. In this case, the turnover judgment reference time is set longer than the jump judgment reference time. This certainly prevents an error in judgment between a jump and turnover from occurring.

Turnover corresponding control part 11e stops a drive of ignition plug 21 or injection of fuel by injector 22 to stop a drive of engine 20 when turnover judging part 11d judges that the vehicle has been turned over.

Figure 7:
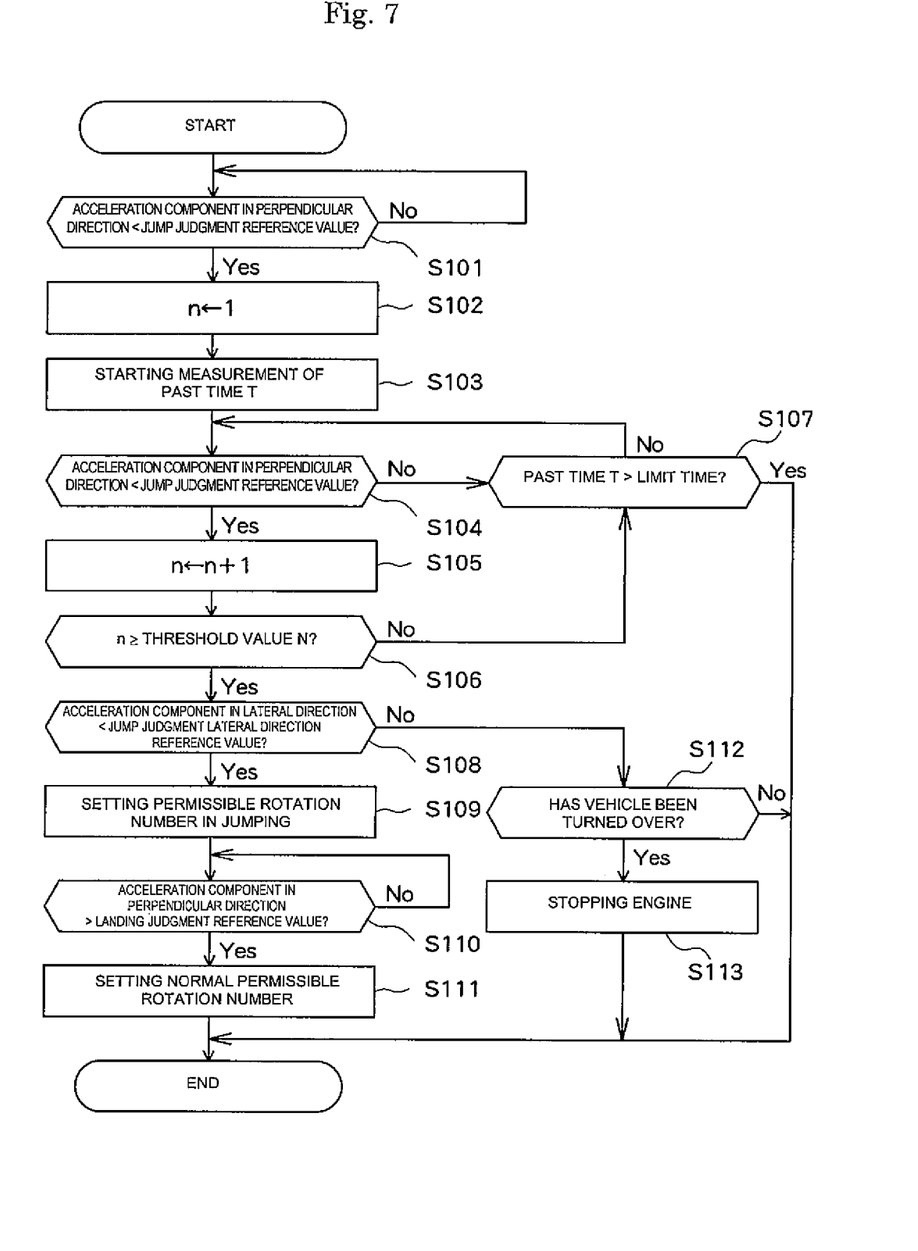
FIG. 7 is a flowchart of a jump judging process and a setting process of a permissible rotation number, which are executed by a control circuit of the invention.

A process flow executed by control circuit 11 is now described with reference to FIG. 7. In this example, it is assumed that an initial value of the permissible rotation number of engine 20 is set at the normal permissible rotation number.

Jump judging part 11a detects an acceleration component in the perpendicular direction of the vehicle body based on an acceleration signal inputted from acceleration detecting device 16 to judge whether the detected acceleration component is smaller than the jump judgment reference value or not (S101). When the acceleration component is not smaller than the jump judgment reference value, S101 is repeated in a predetermined sampling cycle (several tens milliseconds, for example) until an acceleration component smaller than the jump judgment reference value is detected.

Jump judging part 11a starts judging whether an acceleration component smaller than the jump judgment reference value is continuously detected or not since the vehicle is likely to have jumped when the detected acceleration component is smaller than the jump judgment reference value.

Concretely, jump judging part 11a first substitutes an initial value 1 for a parameter n (S102) to start measuring a past time T from a point of time when the acceleration component in the perpendicular direction becomes smaller than the jump judgment reference value in S101 (S103). Jump judging part 11a then detects the acceleration component in the perpendicular direction again based on the acceleration signal from acceleration detecting device 16 to judge whether the acceleration component is smaller than the jump judgment reference value or not (S814). When the acceleration component is smaller than the jump judgment reference value here, parameter n is only increased by 1 (S105) to judge whether parameter n is equal to or more than a predetermined threshold value N or not (S106). When parameter n does not yet reach threshold value N, it is judged whether past time T exceeds a predetermined limit time or not (S107). Jump judging part 11a returns to the process in S104 when past time T does not yet exceed the predetermined limit time.

On the other hand, jump judging means 11a judges that the vehicle is not jumping to complete the process when past time T has reached the limit time. When the detected acceleration component is judged to be equal to or more than the jump judgment reference value in S104, the process goes to S107 to judge whether past time T exceeds the limit time or not.

When parameter n reaches threshold value N in S106, jump judging part 11a detects an acceleration component in the lateral direction of the vehicle to judge whether the acceleration component is smaller than the above-mentioned jump judgment lateral direction reference value or not (S108). The vehicle is judged to be in a jump when the acceleration component in the lateral direction is smaller than the jump judgment lateral direction reference value. Permissible rotation number setting part 11b then sets the permissible rotation number of engine 20 at the permissible rotation number in jumping lower than the normal permissible rotation number (S109).

Control circuit 11 next starts a process for judging whether the vehicle has landed or not. Concretely, jump judging part 11a detects an acceleration component in the perpendicular direction again to judge whether the acceleration component is more than the landing judgment reference value or not (S110). When the detected acceleration component is equal to or less than the landing judgment reference value, jump judging part 11a judges that the vehicle is still jumping. Jump judging part 11a then repeats S110 after a predetermined sampling cycle has past. On the other hand, jump judging part 11a judges that the vehicle has landed when the detected acceleration component is more than the landing judgment reference value. Permissible rotation number setting part 11b then sets the permissible rotation number of engine 20 at the normal permissible rotation number (S111).

When the acceleration component in the lateral direction of the vehicle is judged to be larger than the jump judgment lateral direction reference value in S108, jump judging part 11a judges that the vehicle is not jumping. Turnover judging part 11d then judges whether the vehicle has been turned over or not (S112). For example, turnover judging part 11d calculates the tangent value tan(θ) of rolling angle θ of the vehicle based on the acceleration component in the lateral direction of the vehicle and the acceleration component in the perpendicular direction to judge whether the tangent value exceeds the turnover judgment reference value or not, as described above. When turnover judging part 11d judges that the vehicle has been turned over, turnover corresponding control part 11e stops a drive of ignition plug 21 or injection of fuel by injector 22 to stop a drive of engine 20 (S113). Control circuit 11 ends the process when turnover judging part 11d judges that the vehicle has not been turned over in S112. The process described above is an example of the process executed by control circuit 11. Control circuit 11 executes the process repeatedly during running of the vehicle.

In accordance with the invention, the permissible rotation number of engine 20 is set to be lower in jumping than in normal running. This effectively suppresses a rise in rotation number of the engine during a jump of the vehicle.

Further, turnover of the vehicle is judged based not only acceleration detected by acceleration sensor 13 but also on whether the vehicle has jumped or not. This certainly prevents errors in judgment between jumping and turnover from occurring.

The invention is not limited to the particular embodiment of engine control apparatus 10 described above and may be variously modified. For example, in the above description, one of detection direction by acceleration sensor 13 is set at a perpendicular direction of the vehicle and the judgment as to whether the vehicle has jumped or not is carried out based on an acceleration component in the perpendicular direction. The direction of detection, however, is not limited to the above and may instead be a direction inclining at a fixed angle with respect to the perpendicular direction, for example. In this case, the jump judgment reference value may be set in accordance with the angle of inclination.

Moreover, in engine control apparatus 10, control circuit 11 changes the setting of the permissible rotation number of engine 20 from the normal permissible rotation number to the permissible rotation number in jumping in order to suppress a rise in rotation number of the engine when the vehicle is judged to have jumped. The process for suppressing a rise in rotation number of the engine, however, is not limited to the above and may be control for reducing an output of engine 20, for example. Concretely, when control circuit 11 judges that the vehicle has jumped, it may delay timing of ignition or reduce frequency of ignition of engine 20 by ignition plug 21 to reduce the output of engine 20 regardless of the rotation number of the engine at that time.

Furthermore, in engine control apparatus 10, control circuit 11 decreases the permissible rotation number of engine 20 when the vehicle is judged to have jumped. What is subject to control in jumping, however, is not limited to the above. For example, an adjusting mechanism for electromagnetically varying attenuation force (restoration force) of front suspension 5 may be provided so that control circuit 11 can vary the attenuation force of front suspension 5 in accordance with a result of the judgment by jump judging part 11*a*.

Figure 8:
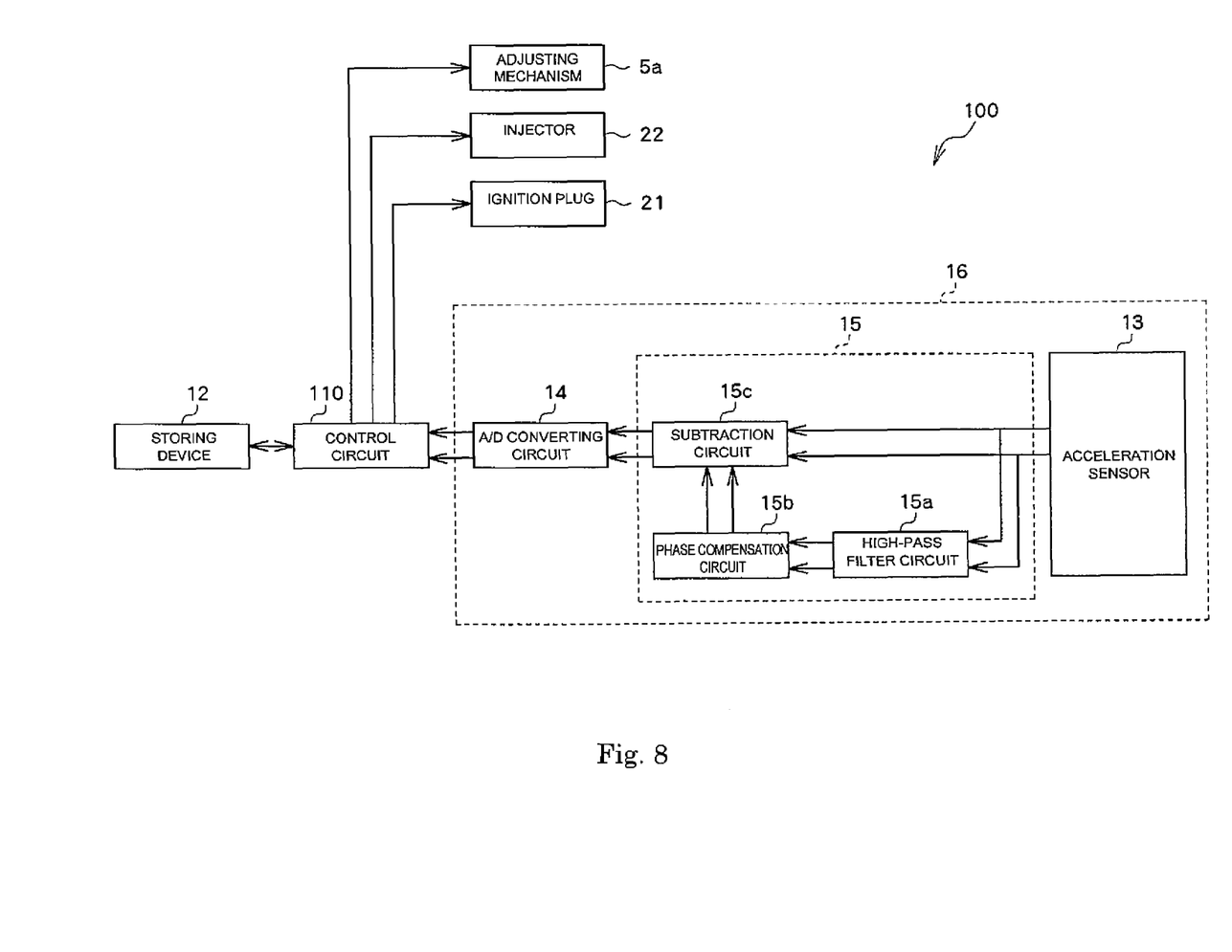
FIG. 8 is a block diagram of an engine control apparatus in accordance with another embodiment of the invention.
Figure 9:
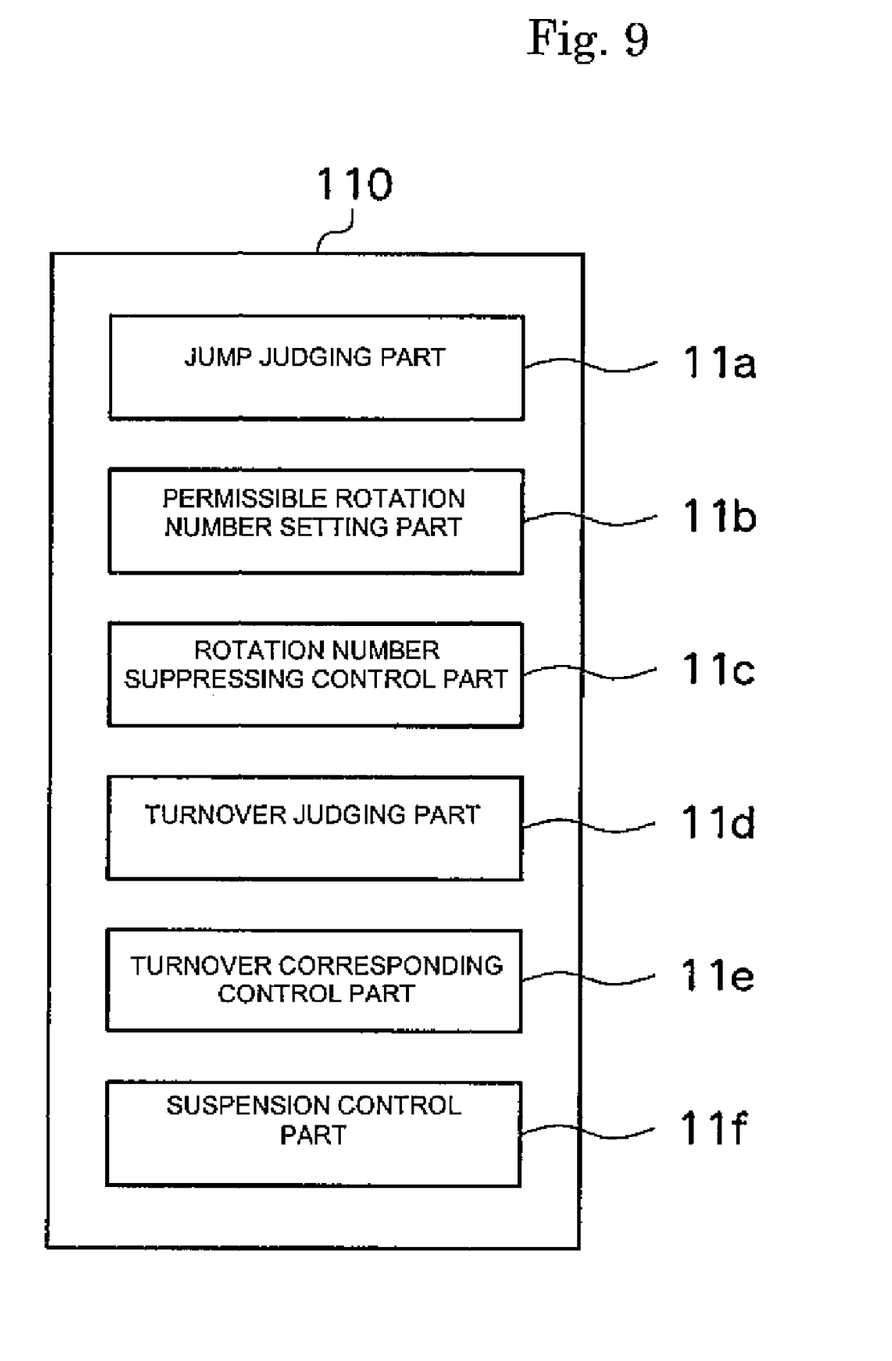
FIG. 9 is a block diagram of a control circuit of the engine control apparatus of FIG. 8.

FIG. 8 is a block diagram of an engine control apparatus 100 in accordance with this embodiment. FIG. 9 is a functional block diagram of control circuit 110 in accordance with the embodiment. In FIGS. 8 and 9, structure already described is marked with the same reference sings and numerals and omitted from description.

As shown in FIG. 8, engine control apparatus 100 comprises an adjusting mechanism 5*a* for electromagnetically varying attenuation force of front suspension 5. Adjusting mechanism 5*a* comprises an electromagnetic throttle valve for opening and closing a part of an oil flowing path of an oil dumper mechanism provided in front suspension 5. Adjusting mechanism 5*a* is connected to control circuit 110.

As shown in FIG. 9, control circuit 110 includes a suspension control part 11*f* other than the above-mentioned jump judging part 11*a*. Suspension control part 11*f* controls adjusting mechanism 5*a* to vary the attenuation force of front suspension 5 based on a result of the judgment by jump judging part 11*a*. For example, when jump judging part 11*a* judges that the vehicle has jumped, suspension control part 11*f* operates the electromagnetic throttle valve of adjusting mechanism 5*a* to open a part of the oil flowing path in the oil dumper mechanism included in suspension 5. This allows the attenuation force to be increased more than the attenuation force in normal running, so that front suspension 5 can be easily contracted more than the case of normal running. Suspension control part 1 if then stops the above-mentioned operation of the throttle valve to close a part of the oil flowing path after the predetermined time has passed from a point of time when jump judging part 11*a* judges that the vehicle has landed.

The particular embodiments of the invention described in this document should be considered illustrative, rather than restrictive. Modification to the described embodiments may be made without departing from the spirit of the invention as defined by the following claims.

The invention claimed is:

1. An engine control apparatus comprising:
    an acceleration detecting means for detecting an acceleration component of gravity acceleration in a predetermined direction of a vehicle;
    a jump judging means for judging whether the vehicle has jumped and is in the air or not on the basis of the acceleration component detected by the acceleration detecting means; and
    a rotation number rise suppression processing means for suppressing a rise in rotation number of an engine when the jump judging means judges that the vehicle has jumped and is in the air.

2. The engine control apparatus according to claim 1, wherein the jump judging means judges that the vehicle has jumped and is in the air based on detecting that the acceleration component has satisfied a predetermined condition continuously for a predetermined time.

3. The engine control apparatus according to claim 1, wherein the acceleration detecting means detects another acceleration component of gravity acceleration in an orthogonal direction that is orthogonal to the predetermined direction,
    and further wherein the jump judging means judges whether the vehicle has jumped and is in the air or not on also the basis of the another acceleration component.

4. An engine control apparatus comprising:
    an acceleration detecting means for detecting an acceleration component of gravity acceleration in a predetermined direction of a vehicle;
    a jump judging means for judging whether the vehicle has jumped or not on the basis of the acceleration component detected by the acceleration detecting means;
    a rotation number rise suppression processing means for suppressing a rise in rotation number of an engine when the jump judging means judges that the vehicle has jumped; and
    a turnover judging means for judging whether the vehicle has been turned over or not based on the acceleration component detected by the acceleration detecting means and a result of judgment by the jump judging means.

5. The engine control apparatus according to claim 4, further comprising a turnover control means that stops a drive of the engine when the turnover judging means judges that the vehicle has been turned over.

6. The engine control apparatus according to claim 5, wherein the rotation number of the engine is suppressed so as to not stop the engine.

7. An engine control apparatus comprising:
    an acceleration detecting means for detecting an acceleration component of gravity acceleration in a predetermined direction of a vehicle;
    a jump judging means for judging whether the vehicle has jumped or not on the basis of the acceleration component detected by the acceleration detecting means;
    a rotation number rise suppression processing means for suppressing a rise in rotation number of an engine when the jump judging means judges that the vehicle has jumped;
    an adjusting mechanism for electromagnetically varying attenuation force of a suspension; and
    a suspension control means for varying the attenuation force of the suspension obtained by the adjusting mechanism based on a result of judgment by the jump judging means.

8. A straddle-type vehicle comprising an engine control apparatus that includes
    an acceleration detecting means for detecting an acceleration component of gravity acceleration in a predetermined direction of the vehicle,
    a jump judging means for judging whether the vehicle has jumped and is in the air or not on the basis of the acceleration component detected by the acceleration detecting means, and
    a rotation number rise suppression processing means for suppressing a rise in rotation number of an engine when the jump judging means judges that the vehicle has jumped and is in the air.

9. The straddle-type vehicle according to claim 8, wherein the acceleration detecting means detects another acceleration component of gravity acceleration in an orthogonal direction that is orthogonal to the predetermined direction,
    and further wherein the jump judging means judges whether the vehicle has jumped and is in the air or not on also the basis of the another acceleration component.

* * * * *